United States Patent [19]

Therrien

[11] Patent Number: 4,567,076
[45] Date of Patent: Jan. 28, 1986

[54] COMPOSITE MATERIAL STRUCTURE WITH INTEGRATED INSULATING BLANKET AND METHOD OF MANUFACTURE

[75] Inventor: Keith E. Therrien, Wausau, Wis.

[73] Assignee: The Boeing Company, Seattle, Wash.

[21] Appl. No.: 592,539

[22] Filed: Mar. 23, 1984

[51] Int. Cl.⁴ ............................................... B32B 3/06
[52] U.S. Cl. ..................... 428/102; 156/148;
428/116; 428/246; 428/251; 428/298; 428/408; 428/920
[58] Field of Search ............... 428/102, 116, 117, 246, 428/251, 298, 920, 408; 156/148

[56] References Cited
U.S. PATENT DOCUMENTS

| | | | |
|---|---|---|---|
| 4,086,737 | 5/1978 | Byrd | 428/102 |
| 4,256,790 | 3/1981 | Lackman et al. | 428/102 |

Primary Examiner—James J. Bell
Attorney, Agent, or Firm—Joan H. Pauly

[57] ABSTRACT

A load-bearing composite material structure (2) includes a first ply (10) of fiber reinforced composite material, and an integral blanket (20) for thermal and flame protection. Blanket (20) includes an outer flame resistant face sheet (28), an intermediate layer of insulation fill (26), and an inner face sheet (22). Sheet (22) is formed by a second ply of fiber reinforced composite material. Preferably, a thin film (24) is provided between ply (22) and fill (26) to prevent absorption of matrix material into fill (26). The layers (22, 24, 26, 28) of blanket (20) are stitched together with flame resistant thread (30). Plies (10, 22) are cured together to bond them together and integrate blanket (20) into structure (2).

8 Claims, 3 Drawing Figures

U.S. Patent  Jan. 28, 1986  4,567,076

COMPOSITE MATERIAL STRUCTURE WITH INTEGRATED INSULATING BLANKET AND METHOD OF MANUFACTURE

TECHNICAL FIELD

This invention relates to composite material structures and methods of manufacturing the same and, more particularly, to such a structure that is load-bearing and includes an integrated blanket for fire and thermal protection, which blanket has a load-bearing inner face sheet.

BACKGROUND ART

It is well-known that certain areas in an aircraft contain both a potential source of ignition and potential leakage of flammable liquid and/or vapor. In some of these areas, it is not possible to separate the potential ignition sources and any such leakage. Areas in commercial aircraft in which this separation cannot be accomplished are defined as fire zones and are required by the Federal Aeronautics Administration (FAA) to be separated from the rest of the aircraft by "fireproof" firewalls. Under FAA regulations, "fireproof" means able to withstand exposure to heat and flame at least as well as steel, or able to withstand exposure to a 2,000 degree F. flame for fifteen minutes without flame penetration. Designated fire zones include the regions in which each engine, auxiliary power unit, fuel-burning heater, and other combustion equipment intended for operation in flight are located. For example, the combustion, turbine, and tailpipe sections of turbine engines must be isolated from the rest of the aircraft.

In order to meet the FAA requirements, composite structures in engine nacelle and auxiliary power unit high temperature environments must be provided with flame and thermal protection. Known methods for providing such protection involve the use of nonstructural devices to shield the composite material structure. The methods presently in use include the application of a spray-on coating to the surface to be protected and the provision of insulation in the form of a separate blanket in front of the surface to be protected.

These methods have serious drawbacks since they tend to add to the cost of the aircraft, they add to the weight of the aircraft, and they are relatively difficult and expensive to maintain. Spray-on coatings are subject to cracking and peeling and therefore must be repaired or replaced fairly frequently. In addition, spray-on coatings are relatively difficult and time-consuming to apply and to inspect, adding to installation costs and further adding to maintenance costs. Separate blanket insulation systems add extra weight to the aircraft, consume valuable space in the aircraft, and are fairly costly to produce and install. In addition, in known blanket insulation systems the blanket is generally adhesively bonded and/or mechanically fastened to the structure being protected. The adhesive bonds are subject to peeling problems which add to the cost of maintenance and detract from the reliability of the protection provided. The mechanical bonds add to the weight of the aircraft, add to the cost of the aircraft by requiring more parts and more complicated installation procedures, and require special precautions to ensure against any discontinuity in the protection provided.

Each of the following U.S. patents discloses an apparently load-bearing wall or panel that is itself fire and/or heat resistant: No. 3,046,170, granted July 24, 1962, to H. A. Toulmin, Jr.; No. 3,106,503, granted Oct. 8, 1963, to B. M. Randall et al; No. 3,122,883, granted Mar. 3, 1964, to E. Terner; and No.3,364,097, granted Jan. 16, 1968, to J. B. Dunnington. Toulmin, Jr. discloses laminates of metal plated glass fibers. Randall et al disclose honeycomb panels of paper and asbestos with a flame and heat resistant cementitious coating. Terner discloses a heat resistant wall structure for rocket motor nozzles and the like. The wall has an outer steel portion, intermediate laminations of a refractory material such as graphite, insulating layers of material such as silica or quartz between these laminations, and an inner vented layer of a ceramic or metallo-ceramic material. Dunnington discloses a fire resistant panel consisting of a paper honeycomb filled with a fire retardant and having wood face sheets.

U.S. Pat. No. 4,302,496, granted Nov. 24, 1981, to J. G. Donovan, discloses a fire resistant waterproof fabric for tent walls and the like. The fabric has inner and outer woven flame resistant plies and a middle ply of a hydrophobic, moisture vapor permeable material.

The patent literature includes a number of examples of approaches to providing fire and/or thermal protection in the form of a barrier that may be attached to a load-bearing structure. U.S. Pat. No. 3,799,056, granted Mar. 26, 1974, to P. Colignon, and U.S. Pat. No. 4,037,006, granted July 19, 1977, to F. W. Roberts et al, disclose barriers that are mechanically attached to a structure. Colignon discloses thermal insulation for use between the heat shield and the body of a space vehicle. The insulation includes an outer thin metal sheet, an intermediate layer of insulation filling having a number of spaced refractory screens, and an inner layer of foamed polyimide. Roberts et al. disclose an insulating panel for use in building construction. The panel consists of a gypsum board with a layer of thermoplastic foam formed thereon and sheets of flame retardant material on the top and sides of the foam.

Thermal insulation that is adhesively bonded onto a structure is disclosed in U.S. Pat. Nos. 4,151,800, granted May 1, 1979, to R. L. Dotts et al; No. 4,232,620, granted Nov. 11, 1980, to M. Kurz; and No. 4,299,872, granted Nov. 10, 1981, to A. S. Miguel et al. Dotts et al disclose sheets of coated felt insulation that are adhesively attached to a spacecraft. Kurz discloses a thermal insulation of alternating layers of a mesh material such as nylon and a plastic film that are stitched together and then bonded to a structure with an adhesive. Miguel et al disclose a fire retardant thermal barrier to be adhesively bonded to the interior of an aircraft skin. The barrier is a honeycomb made from a material such as glass-phenolic filled with an intumescent material.

U.S. Pat. No. 4,310,587, granted Jan. 12, 1982, to P. M. Beaupre, discloses a fire resistant vapor barrier sheet for use with insulation inside building walls. The barrier includes a substrate of a material such as polyester having metalized surfaces and a layer of fire resistant radiation cured resin covering one of the metalized surfaces. The metalized surface opposite the resin is adhesively bonded to conventional insulation batting.

The following United States patents also disclose fire and/or thermal barriers: U.S. Pat. No. 3,203,849, granted Aug. 31, 1965, to H. S. Katz et al; No. 4,256,799, granted Mar. 17, 1981, to T. Ohashi et al; and No. 4,292,369, granted Sept. 29, 1981, to T. Ohashi et al. Katz et al disclose a heat shield for use in environments such as in aircraft and missiles. The shield has alternating layers of insulating material and heat conducting material, which layers are adhesively bonded together. The two Ohashi et al patents disclose fireproof laminates for use in building construction. The laminates include a foamed core with plies of fire resistant material on one or both sides that are attached through self-adhesion of the foam.

U.S. Pat. No. 4,122,203, granted Oct. 24, 1978, to J. S. Stahl, discloses a fire and thermal protective coating for foam plastic panels. The coating is a synthetic resin having hydrated magnesium sulphate dispersed therein and is flowed or sprayed onto a foam plastic panel.

Separate blanket insulation systems of the type used in aircraft are well-known in the art and commonly made by providing a layer of insulation fill material with front and back face sheets. Fibrous ceramic insulation fill has been available for a number of years. Such insulation was initially provided with stainless steel face sheets. Because of their weight, the stainless steel face sheets had to be very thin and thus had the serious disadvantage of being easily punctured. Quartz face sheets have been used, but have the disadvantage of being susceptible to crystallization and embrittlement at about 1300° F. Fire conditions in aircraft generally produce surface temperatures in the range of 1600° to 1900° F.

The problems associated with stainless steel and quartz face sheets were solved when woven ceramic fabrics unaffected by temperatures up to about 2600° F. became available. The Hexcel Corporation of Dublin, Calif. markets a blanket with front and back face sheets of a woven ceramic fabric sold by Hexcel Corporation under the trademark Nextel. This blanket has been used in DC-10 thrust reversers and has been FAA certified by fire testing. In such blankets, the face sheets are commonly attached to the insulation fill by sewing the three layers together.

Proposals have been made to attach the insulation and two face sheets to partially cured layers of graphite epoxy by sewing the insulation and face sheets and the graphite epoxy layers together. The curing process would then be completed. Since the graphite epoxy would be partially cured before being sewn to the blanket, the epoxy matrix would flow only slightly in the final curing process and would not be absorbed into the insulation through the ceramic fabric face sheet. If it were desired to attach such a sewn together product to further layers of fiber reinforced composite material, either before or after final curing, adhesives or mechanical fasteners would be required since the graphite epoxy sewn to the blanket would already have been cured to a point at which the epoxy matrix would flow only slightly.

The above patents and the prior art that is discussed and/or cited therein should be studied for the purpose of putting the present invention into proper perspective relative the prior art.

DISCLOSURE OF THE INVENTION

A subject of the invention is a load-bearing composite material structure with integral thermal and flame protection. According to an aspect of the invention, the structure comprises a first ply of composite material and an integral blanket. The ply of composite material includes a matrix material and a fibrous material reinforcing the matrix material. The integral blanket includes an inner face sheet formed by a second ply of composite material, a flame resistant outer face sheet, and a layer of insulation fill between said inner and outer face sheets. The second ply of composite material includes a matrix material reinforced by a fibrous material. This second ply is cured together with the first ply to bond the first and second plies together and integrate the blanket into the structure. The layer of insulation fill is of sufficient thickness and sufficiently low thermal conductivity to provide a predetermined degree of thermal insulation. The blanket also includes high temperature resistant thread stitched through the layers of the blanket to sew such layers together. Preferably, the blanket further includes a thin film between said second ply and the fill to prevent absorption of matrix material into the fill.

The structure of the invention may take a number of forms, including laminate and honeycomb constructions. In laminate constructions, the structure may comprise one or more additional plies of fiber reinforced composite material that are cured together with the first and second plies to form with the first and second plies a load-bearing laminate. In honeycomb constructions, the structure may further comprise a fiber reinforced composite material honeycomb core and at least one additional ply of fiber reinforced composite material. The core and additional ply are cured together with the first and second plies to form with the first and second plies a load-bearing honeycomb laminate.

According to a preferred aspect of the invention, the outer face sheet comprises a woven ceramic fabric. According to another preferred aspect of the invention, the thread comprises a quartz material.

Another subject of the invention is a method of manufacturing a load-bearing composite material structure and of providing this structure with integral flame and thermal protection. According to an aspect of the invention, the method comprises forming a first ply of fiber reinforced composite material, and forming a separate second ply of fiber reinforced composite material. A blanket for flame and thermal protection is made. Making the blanket includes using the second ply for an inner face sheet, and stitching such second ply with flame resistant thread to an intermediate layer of insulating fill and a flame resistant outer face sheet. The first ply and the blanket are cured together to bond the first and second plies together and integrate the blanket into the structure. Preferably, a thin film is provided between the layer of fill and the second ply to prevent absorption of matrix material from the second ply into the fill.

The method and apparatus of the invention solve the problems discussed above in relation to providing composite structures in engine nacelle and auxiliary power unit high temperature environments with FAA required fire and thermal protection. In structures constructed according to the invention, the fire and thermal protection is fully integrated into the load-bearing structure itself, and therefore, there is no need for separate manufacture and/or installation of such protection. This results in considerable savings in the cost of manufacturing the aircraft. There is also a considerable savings in weight (about 25 percent) in comparison to conventional separate blanket insulation methods of providing fire and thermal protection. In situations in which a structure constructed according to the invention may be substituted for a conventional structure and its associated fire and thermal protection means, there may also be further significant savings in the overall cost of the aircraft due to savings in material costs. When a metallic firewall is replaced by a structure made according to the invention, weight and cost savings may be achieved, and there is the additional benefit of a reduced need to isolate systems behind the structure because of much lower heat fluxes through the composite structure.

Structures constructed according to the invention can easily be made to meet the FAA requirements for maintaining structural integrity and for resisting flame penetration by a careful choice of materials, but such structures are not subject to the numerous maintenance problems associated with commonly used methods for providing flame and thermal protection. Structures of the invention are relatively easy to inspect and should not require any more than routine maintenance unless there is actually a fire in the fire zone to which the structure is exposed. The problems of cracking and peeling and of the need for time-consuming inspections associated with providing protection in the form of coatings are not experienced by structures of the invention. In addition, the blanket portions of the structures are fully integrated into the structure without the need for adhesives or mechanical fasteners. Thus, the problems experienced with the use of adhesives and mechanical fasteners are avoided. The problems of peel and delamination associated with the use of adhesives are eliminated, resulting in a great savings in the time and cost required to maintain the structures. The problems of added cost and weight and of the need for special precautions associated with the use of mechanical fasteners are also eliminated.

The method and apparatus of the invention also have the advantage of being highly versatile. They can be applied to the manufacture of virtually any type of composite material structure, including both laminates and honeycomb structures. They can also be used in composite material structures with virtually any shape. In addition, the thickness and composition of the fill may be varied to meet the needs of a wide variety of situations.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 1:
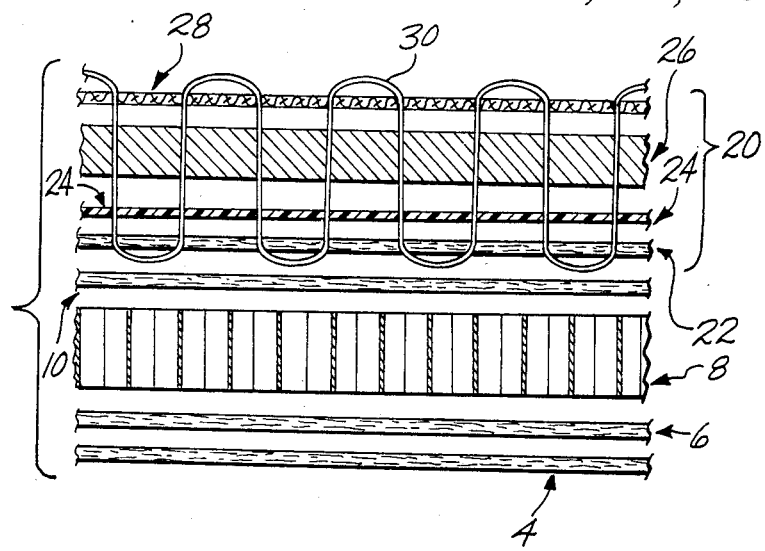
FIG. 1 is an exploded cross-sectional view of the preferred embodiment of the apparatus of the invention made in accordance with the preferred embodiment of the method of the invention.

The drawings show a composite material structure 2 that is constructed according to the invention and that also constitutes the best mode of the apparatus of the invention currently known to the applicant. The structure 2 is manufactured in accordance with the best mode of the method of the invention currently known to the applicant. The structure 2 shown in the drawings includes a honeycomb core layer 8 and laminate layers or plies 4, 6, 10. It is anticipated that a typical use of the method and apparatus of the invention will be in the manufacture of honeycomb/laminate composite material structures such as that illustrated in the drawings. However, it is of course to be understood that the method and apparatus of the invention may be applied to other types of composite material structures, including laminate structures which do not have a honeycomb core.

The present invention is directed toward the provision of load-bearing composite material structures with integral thermal and flame protection. Structures constructed in accordance with the invention are characterized by a first ply of composite material and an integral blanket that provides the required thermal and flame protection. Additional layers are provided as necessary to provide the structure with the strength characteristics required in a particular installation. Such additional layers would ordinarily include additional plies or laminates of composite material and, in many cases, a core layer of a fiber reinforced composite material honeycomb.

In the structure 2 shown in the drawings, the first ply 10 of composite material includes a thermosetting matrix material and a fibrous material reinforcing the matrix material. The exact choice of the matrix material and the fibrous material and the orientation of the fibers in the matrix depend on the strength requirements of a particular situation. A typical choice of materials would be an epoxy matrix reinforced by graphite fibers.

The blanket that provides thermal and flame protection is designated by the reference numeral 20 in the drawings. The blanket 20 includes a layer of insulation fill 26, an inner face sheet 22, and an outer face sheet 28. The material comprising the fill 26 and the thickness of the fill layer is chosen to provide the degree of thermal insulation required in a particular installation. The fill material must be heat and flame resistant and have a sufficiently low thermal conductivity to provide the required thermal insulation. A number of suitable materials are commercially available for use as insulation fill. A preferred fill material is a fibrous ceramic material, such as the fibrous ceramic insulation sold by Johns-Mannville, Inc., of Boulder, Colo. under the trademark MIN-K.

The outer face sheet 28 is placed adjacent to the fill 26 on its outer hot side. This outer face sheet 28 is heat and flame resistant and functions to prevent or at least delay the penetration of flame. The preferred material for the outer face sheet 28 is a woven ceramic fabric, such as the ceramic fabric manufactured by Hexcel Corporation of Dublin, Calif. under the trademark Nextel. This fabric will withstand temperatures of up to about 2600 degrees F. for indefinite periods of time. The fabric has a very tight weave to resist the penetration of flame. Examples of other materials that may be used when the requirements of a particular installation permit are S-glass, E-glass, and quartz.

The inner face sheet 22 is formed by a second ply of composite material. This second ply 22, like the first ply 10, includes a thermosetting matrix material reinforced by a fibrous material. The second ply 22 performs a dual function; it is both the inner face sheet of the blanket 20 and a load-bearing portion of the composite material structure 2. This feature has a number of advantages including the reduction of the total number of layers of the structure and, thus, the reduction of its size and weight, and of the elimination of any need for backside sealing of the blanket. Sealing around the edges and front of the blanket 20 is a design dependent option and may be accomplished by any of a number of known procedures.

As in the case of the first ply 10, the choice of materials and the orientation of the fibers in the second ply 22 are determined by the load-bearing requirements of the installation into which the structure 2 is to be incorporated. Again, typical materials would be an epoxy matrix reinforced by graphite fibers. The materials need not be identical to the materials in the first ply 10, but the matrix materials of the two plies 10, 22 must be compatible with each other so that, when the structure 2 is cured, the two plies 10, 22 will merge into an integral structure.

The preferred embodiment of the blanket 20 shown in the drawings is also provided with a thin film 24 between the fill 26 and the inner face sheet 22. This thin film 24 serves to prevent absorption of matrix material into the fill 26 when the structure is cured. The film 24 may be made from a variety of materials. A preferred material is nylon. Other materials that may be used include a polyimide film.

Before being integrated into the structure 2, the layers 22, 24, 26, 28 of the blanket 20 are sewn together. This is accomplished by stitching high temperature resistant thread 30 through such layers 22, 24, 26, 28. The preferred type of thread for sewing the blanket 20 together is flame resistant quartz thread. Other suitable threads include ceramic threads. In a typical installation the stitches might be about ⅛ of an inch in length, with the rows of stitches being spaced about one inch apart. These dimensions may, of course, be varied to meet the needs of a particular situation.

The structure 2 shown in the drawings also includes a honeycomb core layer 8 and two outer laminate layers or plies 4, 6. As noted above, the particular composition of these additional layers 4, 6, 8, may be varied considerably and is determined by such considerations as the load-bearing requirements of a particular installation. The honeycomb core 8 shown in the drawings may be made from any fiber reinforced composite material. A typical core material is the glass fiber reinforced polyimide core sold by Hexcel Corporation of Dublin, Calif. under the designation HRH-327. The laminate layers 4, 6 may be graphite reinforced epoxy or any other suitable composite material.

The method of the invention is directed toward manufacturing load-bearing composite material structures and of providing such structures with integral flame and thermal protection. The method is carried out as follows:

The first ply 10 of fiber reinforced composite material is formed. The forming of this ply may be carried out by using any of a number of known techniques. The second ply of fiber reinforced composite material 22 is formed separately from the first ply 10. Like the first ply 10, the second ply 22 may be formed by using any of a variety of known techniques.

Once the second ply 22 has been formed, the blanket 20 is made. In the manufacture of the blanket 20, the thermo-insulation fill 26 is provided with a flame resistant outer face sheet 28 and an inner face sheet 22 formed by the second ply 22 of fiber reinforced composite material. Preferably, the blanket 20 is also provided with a thin film 24 between the fill 26 and the inner face sheet 22 of fiber reinforced composite material. The layers of the blanket are placed in position and are sewn together with flame resistant thread 30.

The sewn-together blanket 20 and the other layers of the structure are placed together and cured together. The curing process bonds the first and second plies 10, 22 together to integrate the blanket 20 into the structure. During the curing process, the other layers 4, 6, 8 are also integrated into the structure in a known manner. Following the curing process, the structure 2 with its integral flame and thermal protection is complete and ready to be installed in an aircraft.

Figure 2:
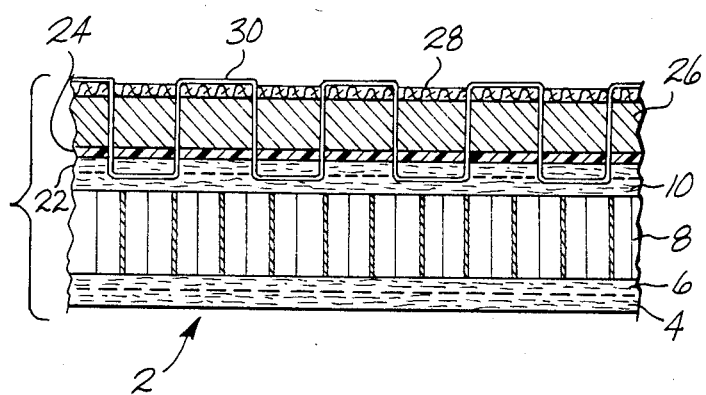
FIG. 2 is a cross-sectional view of the structure illustrated in FIG. 1.

FIG. 1 shows the layers of the structure 2 separated from each other for purposes of illustration. FIG. 2 shows the completed integrated structure 2. In FIG. 2, the dotted lines between layers 4 and 6 and layers 10 and 22 are included for purposes of illustration only. Layers 4 and 6 and layers 10 and 22 are by the curing process fully integrated with each other, and no bond line would be apparent from an examination of the completed structure 2.

The structure 2 shown in FIGS. 1 and 2 is in the form of a flat panel. It is of course to be understood that structures constructed in accordance with the invention may also take a variety of other forms and shapes without departing from the spirit and scope of the invention.

Figure 3:
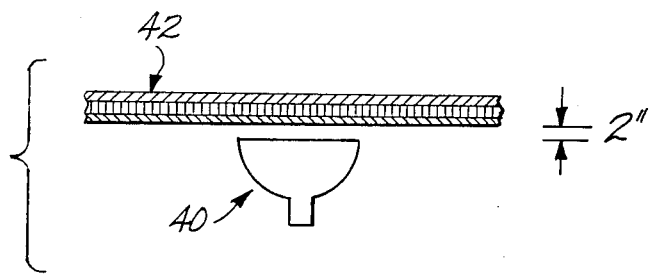
FIG. 3 is a schematic elevational view of the apparatus used for testing the structure of the invention, with the test panel shown in section.

FIG. 3 illustrates in schematic form the testing procedure used for testing panels to determine whether they meet FAA requirements. In the test illustrated in FIG. 3, a test panel 42 was placed two inches above a propane burner 40 set to 1200 degrees F. The test panel 42 had the configuration illustrated in FIGS. 1 and 2. During an actual test, the panel was subjected to the 1200 degree F. flame for a period of eight minutes. During this time, the laminate 10 separated from the honeycomb core 8 but the blanket 20 did not separate. At the time of separation, the bond line temperature between core 8 and layer 10 was measured to be 574 degrees F. This was far above the 350 degrees F. design limit of the composite material panel. Therefore, the test indicated that the integrated blanket design results in a structure that can withstand temperatures much greater than those which would actually be experienced.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A load-bearing composite material structure with integral thermal and flame protection, said structure comprising:
   a first ply of composite material, and an integral blanket bonded to said first ply;
   said first ply including a thermosetting matrix material, and a fibrous material reinforcing the matrix material; and
   said integral blanket including:
   an inner face sheet formed by a second ply of composite material, said second ply including a thermosetting matrix material reinforced by a fibrous material;
   an outer face sheet that is resistant to flame penetration;
   a layer of insulation fill between said inner and outer face sheets of sufficient thickness and sufficiently low thermal conductivity to provide a predetermined degree of thermal insulation; and high temperature resistant thread stitched through the layers of the blanket to sew such layers together;

said first and second plies being cured together, after the layers of the blanket are stitched together, to bond said plies together to in turn bond the blanket to said first ply and integrate the blanket into the structure.

2. A structure as described in claim 1, in which the blanket further includes a thin film between said second ply and the fill to prevent absorption of matrix material into the fill.

3. A structure as described in claim 1, further comprising at least one additional ply of fiber reinforced composite material that is cured together with said first and second plies to form with said first and second plies a load-bearing laminate.

4. A structure as described in claim 1, further comprising a fiber reinforced composite material honeycomb core, and at least one additional ply of fiber reinforced composite material, which core and additional ply are cured together with said first and second plies to form with said first and second plies a load-bearing honeycomb laminate.

5. A structure as described in claim 1, in which the outer face sheet comprises a tightly woven ceramic fabric.

6. A structure as described in claim 5, in which the thread comprises a quartz material.

7. A method of manufacturing a load-bearing composite material structure and of providing said structure with integral flame and thermal protection, said method comprising:

forming a first ply of fiber reinforced composite material having a thermosetting matrix;

forming a separate second ply of fiber reinforced composite material having a thermosetting matrix;

making a blanket for flame and thermal protection; including using said second ply for an inner face sheet, and stitching said second ply with flame resistant thread to an intermediate layer of insulating fill and a flame penetration resistant outer face sheet; and then curing said first ply and said second ply together to bond said plies together to in turn bond the blanket to said first ply and integrate the blanket into the structure.

8. A method as described in claim 7, further comprising providing a thin film between the layer of fill and said second ply to prevent absorption of matrix material from said second ply into the fill.

* * * * *